United States Patent [19]

Blasutti

[11] 4,131,119
[45] Dec. 26, 1978

[54] ULTRASONIC CIGARETTE-HOLDER OR PIPE STEM

[76] Inventor: Claudine Blasutti, 83, rue de Champigny, Chenneviéres-sur-Marne, France, 94430

[21] Appl. No.: 735,278

[22] Filed: Oct. 26, 1976

[30] Foreign Application Priority Data

Jul. 20, 1976 [FR] France ............................ 76 22075

[51] Int. Cl.² .................. A24F 13/02; A24B 15/02
[52] U.S. Cl. .................................. 131/187; 131/262 B
[58] Field of Search .................. 131/187, 262 B, 9.10, 131/200, 262 R; 55/277

[56] References Cited

U.S. PATENT DOCUMENTS

| 3,028,864 | 4/1962 | Minto | 131/262 B X |
| 3,201,338 | 8/1965 | Pennington | 55/277 X |
| 3,416,540 | 12/1968 | Lidums | 131/262 B |

Primary Examiner—Stephen C. Pellegrino
Attorney, Agent, or Firm—George H. Mitchell, Jr.

[57] ABSTRACT

This cigarette-holder or pipe stem comprises a duct connecting the combustion area to the mouthpiece, and means for generating ultrasonic vibration directed across said duct, said means consisting essentially of a battery-operated integrated circuit operating as a power oscillator associated with a piezoelectric ceramic or nickel strip.

8 Claims, 4 Drawing Figures

ULTRASONIC CIGARETTE-HOLDER OR PIPE STEM

BACKGROUND OF THE INVENTION

FIELD OF THE INVENTION

The present invention relates to improvements in cigarette-holders or pipe stems in view of eliminating notably the fine tar or nicotine particles in suspension in the inhaled smoke.

DESCRIPTION OF THE PRIOR ART

At present all filter means utilized in cigarette-holders or pipe stems comprise either a fibrous plug (such as a cotton plug) or condensers consisting of baffle means, so that the tar and nicotine released by the smoked tobacco are, at least theoretically, retained in the inspiration circuit.

In actual practice these filters are efficient only with coarser particles and thus a substantial proportion of the noxious substances are allowed to proceed to the smoker's mouth.

DESCRIPTION OF THE INVENTION

This invention is directed to eliminate the noxious particles which are not eliminated or retained by the filters, notably the conventional-type expander-condenser filters.

According to this invention, the cigarette-holder or pipe stem comprising a duct connecting the tobacco combustion area of the cigarette or the pipe bowl to the mouthpiece is characterized, in principle, in that said duct is exposed to ultrasonic vibration or pressure directed across said duct.

Other features and advantages of this invention will appear as the following description proceeds with reference to the attached drawing, in which a typical form of embodiment of the present invention is illustrated diagrammatically by way of example.

DESCRIPTION OF THE PREFERRED EMBODIMENT

Figure 1:
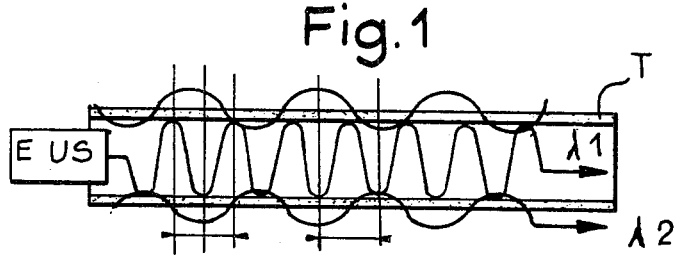
FIG. 1 is a diagram showing the basic principle of the method of retaining the noxious particles fixed by ultrasonic waves.

As illustrated in FIG. 1, if an ultrasonic emitter EUS disposed within the end portion of a glass tube T produces at a 40-KHz frequency pressure areas in the surrounding air, with half-wavelengths $\lambda 1/2$ spaced 4,5 mm from each other, the tube wall also exposed to the ultrasonic vibration shows a 45-mm half wavelength $\lambda 2/2$ which is superposed to the vibration produced in the atmosphere.

The Applicant found that when smoke is caused to flow through the tube T, the noxious particles contained in the smoke are held against motion at each pressure wave loop or antinode, therefore in the present case:
—every 4,5 mm, and on the other hand
—every 45 mm.

Figure 2:
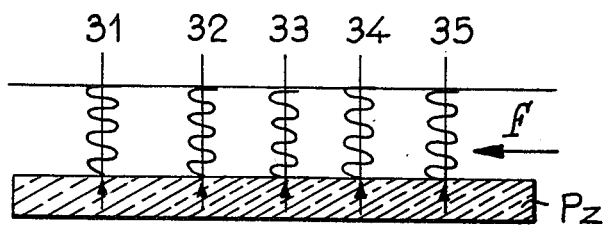
FIG. 2 is a diagram illustrating the transmission of ultrasonic waves from a parallelipipedic piezoelectric ceramic member.

The Applicant further observed that if the ultrasonic wave generator consists of a piezoelectric ceramic element $P_z$ energized as explained hereinafter, the pressure areas are perpendicular to the emitter surface of said ceramic element $P_z$ (FIG. 2).

To stop the noxious particles carried along by the smoke flow, it is therefore advantageous to restrict the cross-section of the duct in which this flow is directed in the direction of the arrow f by inserting into this duct a ceramic member $P_z$ producing pressure areas 31, 32, 33, 34 and 35, etc.

Figure 3:
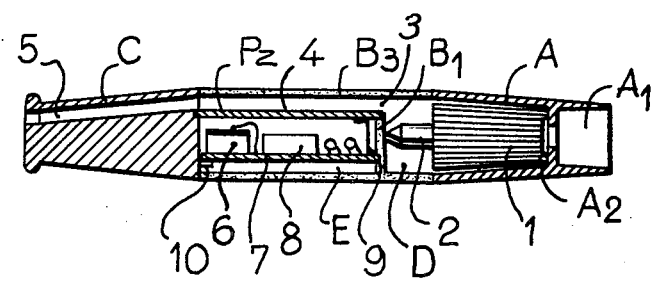
FIG. 3 is an axial section taken along a cigarette-holder according to this invention.
Figure 4:
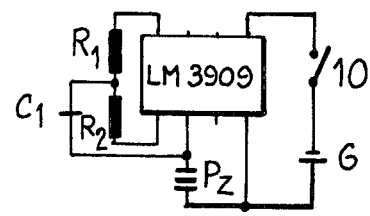
FIG. 4 illustrates a typical wiring diagram of an electronic circuit incorporated in the device of this invention.

As illustrated in FIG. 3, the improved cigarette-holder or pipe stem according to this invention comprises at least two sections C and B, or better still three sections A, B and C, with an upstream section A supporting the cigarette, an intermediate section B and a downstream section C constituting the mouthpiece.

Preferably, this mouthpiece-section C is adapted to rotate in relation to section B.

The first section A comprises a cavity $A_1$ adapted to receive the cigarette tip and another cavity $A_2$ containing either a diffuser-accelerator 1 consisting of an insert formed with peripheral longitudinal splines or of a conventional filter of paper, graphite or other suitable material. This diffuser 1 is formed with an integral abutment-forming element 2.

The next tubular section B comprises a diametral partition $B_1$ dividing it into two chambers, e.i. a first expansion chamber D and a chamber E containing the electronic circuit means.

Both chambers D and E communicate with each other via an orifice 3 tangent to the wall tube in section B. The abutment element 2 of diffuser 1 has a pointed tip engaging the partition $B_1$ to prevent this diffuser from moving further towards said partition $B_1$.

The ceramic element $P_z$, of parallelipipedic configuration in this example, with the negative and positive poles formed on the same face, is secured between partition $B_1$ and section C so as to provide a duct 4 in which the smoke can flow from chamber D, this duct being bounded by the ceramic element $P_z$ and also by the inner surface of the tubular wall of section B, said duct constituting the extension of communication orifice 3.

Section C comprises a suction duct 5 disposed eccentrically so that in one of the relative positions of sections B and C the ducts 4 and 5 communicate with each other.

Enclosed in chamber E underlying the ceramic member $P_z$ is an electronic control module together with the 1.5-Volt supply battery.

This electronic control module comprises a printed circuit 7 and an integrated circuit 8 of the so-called LED system operating as a power oscillator, for example of the LM 3909 type associated with a pair of symmetry resistors $R_1$, $R_2$ and a capacitor $C_1$.

A pair of elongated conducting strips 9 provide the electric connection between the printed circuit 7 and the negative and positive poles of the ceramic element $P_z$.

Section C further encloses a switch 10 adapted to short-circuit the two input terminals of printed circuit 7 in one relative position of sections C and B, which is the position permitting the communication between ducts 4 and 5.

Thus, the smoker cannot forget to set the device in operation since he cannot inhale smoke without exerting a preliminary control action permitting both the aspiration and the filtration of the smoke.

If desired, signal means in the form of a diode lighting system disposed for example within section C may be provided to warn the smoker that the device is energized, and thus prevent the device from being left inadvertendly in its operative condition.

If a nickel strip is substituted for the ceramic element, a small permanent magnet may be used for pre-magnetizing said strip.

Practical tests performed with prototypes of this device proved that up to 85% of the coarse to fine particles are stopped by the above-described cigarette-holder or pipe stem.

In fact, a pipe bowl may be substituted for, or added to, the first section A of the device, in the case of a pipe.

Although a specific form of embodiment of the invention has been described and illustrated herein, it will readily occur to those conversant with the art that various modifications and variations may be brought thereto without departing from the basic principles of the invention as set forth in the appended claims.

What is claimed as new is:

1. Cigarette-holder or pipe stem comprising an elongated body having an upstream end and a downstream end and containing an ultrasonic tobacco smoke treatment device comprising an elongated duct disposed eccentrically in relation to the longitudinal axis of the body having an inlet end to receive the products of tobacco combustion from the upstream end of said body and an outlet end to deliver treated products of combustion to the downstream end of the body, an ultrasonic vibration generator disposed in said duct to generate sound waves transverse to the direction of flow through the duct, said ultrasonic vibration generator comprising a piezoelectric ceramic element driven by an LED integrated circuit power oscillator, and a battery to energize said circuit, said ceramic element forming a portion of the wall of said duct.

2. Cigarette-holder or pipe stem as recited in claim 1, wherein said ceramic element has a parallelipipedic configuration with its major dimension extending in the longitudinal direction of the duct.

3. Cigarette-holder or pipe stem as recited in claim 1, wherein said ceramic element consists of a cylinder having its longitudinal axis parallel to the longitudinal axis of said duct.

4. Cigarette-holder or pipe stem as recited in claim 1, wherein said duct exposed to ultrasonic pressures is disposed downstream of an expansion chamber disposed in said body.

5. Cigarette-holder or pipe stem as recited in claim 4, wherein said expansion chamber is disposed downstream of a diffuser-accelerator disposed in said body consisting of a plurality of capillary or similar grooves or channels.

6. Cigarette-holder or pipe stem as recited in claim 1, wherein said body comprises at least two tubular sections adapted to rotate in relation to each other, wherein one of said tubular sections encloses said duct, the other tubular section comprising an orifice leading to the downstream end of the body, said duct and orifice communicating with each other in a given relative position of said tubular sections.

7. Cigarette-holder or pipe stem as recited in claim 6, wherein said two tubular sections incorporate co-operating contact means constituting a switch and adapted to close the circuit for energizing said integrated circuit in a given relative position of said tubular sections which corresponds to the mutual communication between said duct and said orifice.

8. Cigarette-holder or pipe stem as recited in claim 1, wherein said ultrasonic vibration generator comprises a piezoelectric nickel strip driven by an LED integrated circuit power oscillator, and a battery to energize said circuit, said nickel strip forming a portion of the wall of said duct.

* * * * *